US011394468B2

(12) United States Patent
Zhou et al.

(10) Patent No.: US 11,394,468 B2
(45) Date of Patent: Jul. 19, 2022

(54) SYSTEM AND METHOD FOR TRANSFERRING OPTICAL SIGNALS IN PHOTONIC DEVICES AND METHOD OF MAKING THE SYSTEM

(71) Applicant: Source Photonics, Inc., West Hills, CA (US)

(72) Inventors: Qiugui Zhou, West Hills, CA (US); Mark Heimbuch, West Hills, CA (US); Chao Tian, West Hills, CA (US)

(73) Assignee: Source Photonics Inc., West Hills, CA (US)

( * ) Notice: Subject to any disclaimer, the term of this patent is extended or adjusted under 35 U.S.C. 154(b) by 558 days.

(21) Appl. No.: 16/338,096

(22) PCT Filed: Mar. 22, 2019

(86) PCT No.: PCT/US2019/023547
§ 371 (c)(1),
(2) Date: Mar. 29, 2019

(87) PCT Pub. No.: WO2020/197532
PCT Pub. Date: Oct. 1, 2020

(65) Prior Publication Data
US 2021/0328686 A1    Oct. 21, 2021

(51) Int. Cl.
*H04B 10/80* (2013.01)
(52) U.S. Cl.
CPC .................................. *H04B 10/803* (2013.01)
(58) Field of Classification Search
None
See application file for complete search history.

(56) References Cited

U.S. PATENT DOCUMENTS

| 5,835,517 A | * | 11/1998 | Jayaraman | ........... G02B 6/2938 |
| | | | | 372/50.124 |
| 6,118,474 A | * | 9/2000 | Nayar | .............. G08B 13/19628 |
| | | | | 348/36 |
| 6,198,864 B1 | * | 3/2001 | Lemoff | .............. G02B 6/29367 |
| | | | | 385/24 |

(Continued)

OTHER PUBLICATIONS

International Search Report and Written Opinion; International Searching Authority/US dated Jun. 10, 2019; International Application No. PCT/US2019/023547; 8 pages; International Searching Authority/U.S.; Commissioner for Patents, Alexandria, VA.

*Primary Examiner* — Li Liu
(74) *Attorney, Agent, or Firm* — Andrew D. Fortney; Central California IP Group, P.C.

(57) ABSTRACT

Embodiments of the disclosure pertain to a system for transferring an optical signal from one photonics chip or integrated circuit (PIC) to another. The system includes a first PIC having (i) an optical emitter or optical transmission mechanism and (ii) a focusing mirror thereon, and a second PIC having an optical receiver and a reflecting mirror thereon. The reflecting mirror is configured to reflect light transmitted by the optical emitter or optical transmission mechanism back to the first PIC. The focusing mirror is configured to (i) further reflect the light reflected by the reflecting mirror and (ii) focus the further reflected light on the optical receiver. Methods of using and manufacturing the system are also disclosed.

15 Claims, 7 Drawing Sheets

(56) References Cited

U.S. PATENT DOCUMENTS

| | | | | |
|---|---|---|---|---|
| 6,201,908 B1* | 3/2001 | Grann | | G02B 6/29358 |
| | | | | 385/24 |
| 6,344,846 B1* | 2/2002 | Hines | | G06F 3/0312 |
| | | | | 345/156 |
| 6,636,658 B2* | 10/2003 | Goodman | | G02B 6/2713 |
| | | | | 385/24 |
| 6,870,976 B2* | 3/2005 | Chen | | G02B 6/29367 |
| | | | | 264/1.1 |
| 6,945,711 B2* | 9/2005 | Chen | | G02B 6/2938 |
| | | | | 385/93 |
| 7,349,602 B2* | 3/2008 | Panotopoulos | | G02B 6/4246 |
| | | | | 385/47 |
| 8,594,503 B2* | 11/2013 | Roelkens | | G02B 6/29317 |
| | | | | 398/82 |
| 9,285,544 B2* | 3/2016 | Panotopoulos | | G02B 6/2938 |
| 9,429,725 B2* | 8/2016 | Shao | | G02B 6/4246 |
| 9,692,516 B2* | 6/2017 | Zhou | | G02B 6/4292 |
| 9,804,334 B2* | 10/2017 | Israel | | G02B 6/4243 |
| 10,243,661 B2* | 3/2019 | Sorin | | G02B 6/4204 |
| 10,481,334 B2* | 11/2019 | Israel | | G02B 6/30 |
| 10,564,374 B2* | 2/2020 | Israel | | G02B 6/136 |
| 10,705,302 B2* | 7/2020 | Ji | | G02B 6/12002 |
| 10,866,363 B2* | 12/2020 | Israel | | G02B 6/305 |
| 2001/0033707 A1* | 10/2001 | Patel | | H04Q 11/0005 |
| | | | | 385/16 |
| 2002/0131180 A1* | 9/2002 | Goodman | | G02B 6/29367 |
| | | | | 359/634 |
| 2003/0007202 A1* | 1/2003 | Moser | | G02B 6/2931 |
| | | | | 359/15 |
| 2003/0043157 A1* | 3/2003 | Miles | | G02B 6/1225 |
| | | | | 345/540 |
| 2003/0231828 A1* | 12/2003 | Brock | | G02B 6/42 |
| | | | | 385/33 |
| 2005/0152640 A1* | 7/2005 | Lemoff | | G02B 6/2938 |
| | | | | 385/24 |
| 2009/0202196 A1* | 8/2009 | Kish, Jr. | | H04B 10/2914 |
| | | | | 385/14 |
| 2010/0027577 A1 | 2/2010 | Dutta | | |
| 2011/0058771 A1* | 3/2011 | Lee | | G02B 6/4215 |
| | | | | 385/33 |
| 2011/0135252 A1* | 6/2011 | Kim | | G02B 6/262 |
| | | | | 385/49 |
| 2012/0106890 A1 | 5/2012 | Gu et al. | | |
| 2012/0293797 A1* | 11/2012 | Braeckmans | | G01N 21/05 |
| | | | | 356/246 |
| 2013/0223788 A1* | 8/2013 | Koos | | G02B 6/43 |
| | | | | 385/14 |
| 2015/0050019 A1* | 2/2015 | Sengupta | | H04B 10/2581 |
| | | | | 398/44 |
| 2015/0378095 A1* | 12/2015 | Hsu | | H01L 31/18 |
| | | | | 385/14 |
| 2017/0017050 A1* | 1/2017 | Gamache | | G02B 6/4214 |
| 2017/0102503 A1* | 4/2017 | Israel | | G02B 6/4259 |
| 2018/0031791 A1* | 2/2018 | Israel | | G02B 6/30 |
| 2018/0074264 A1* | 3/2018 | Tokushima | | G02B 6/30 |
| 2018/0231732 A1 | 8/2018 | Paquet et al. | | |
| 2019/0113687 A1* | 4/2019 | Wang | | G02B 6/30 |
| 2019/0179177 A1* | 6/2019 | Rickman | | H04Q 11/0071 |
| 2019/0324211 A1* | 10/2019 | Israel | | G02B 6/305 |
| 2021/0184774 A1* | 6/2021 | Zhou | | H04B 10/5051 |

* cited by examiner

FIG. 5B
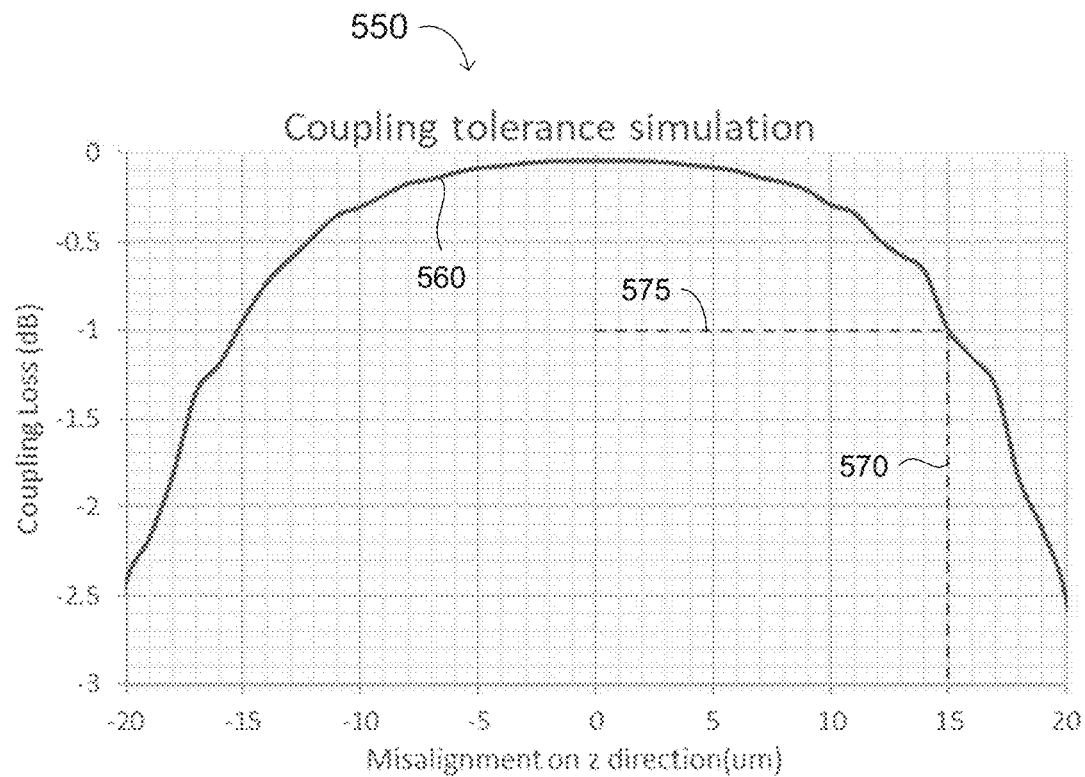
FIG. 6A
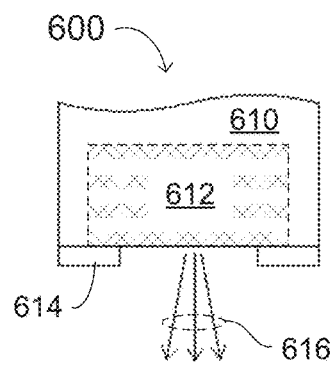
FIG. 6B
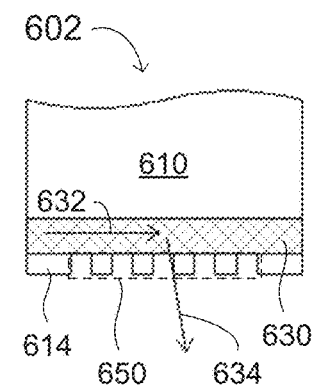
FIG. 6C
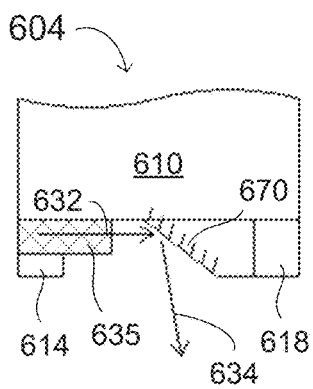
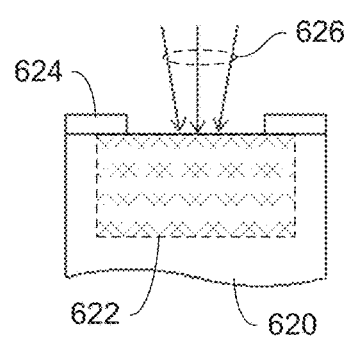
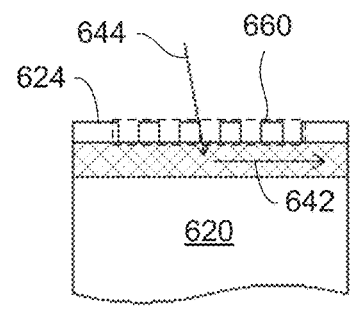
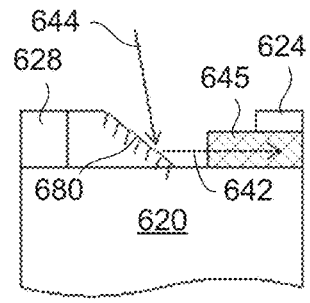

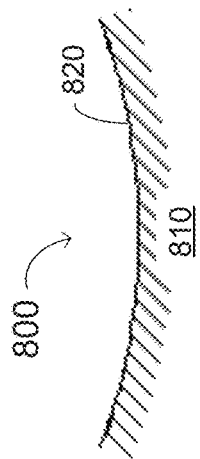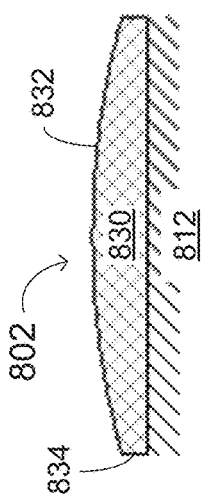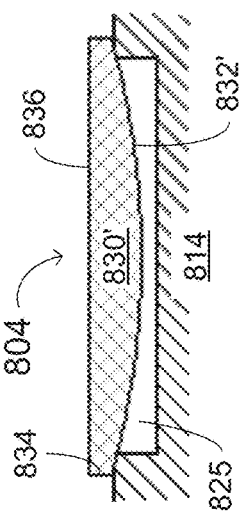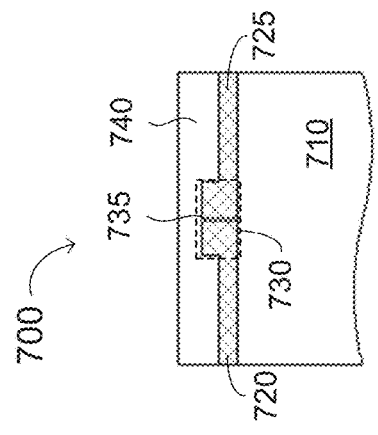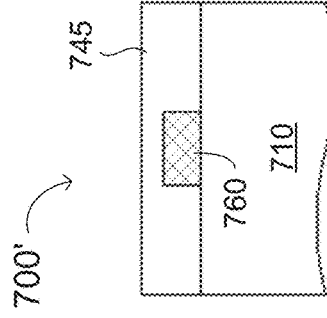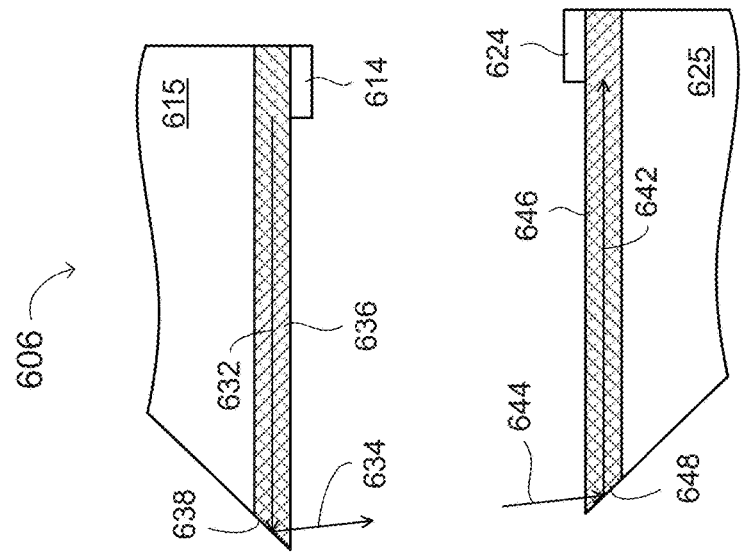

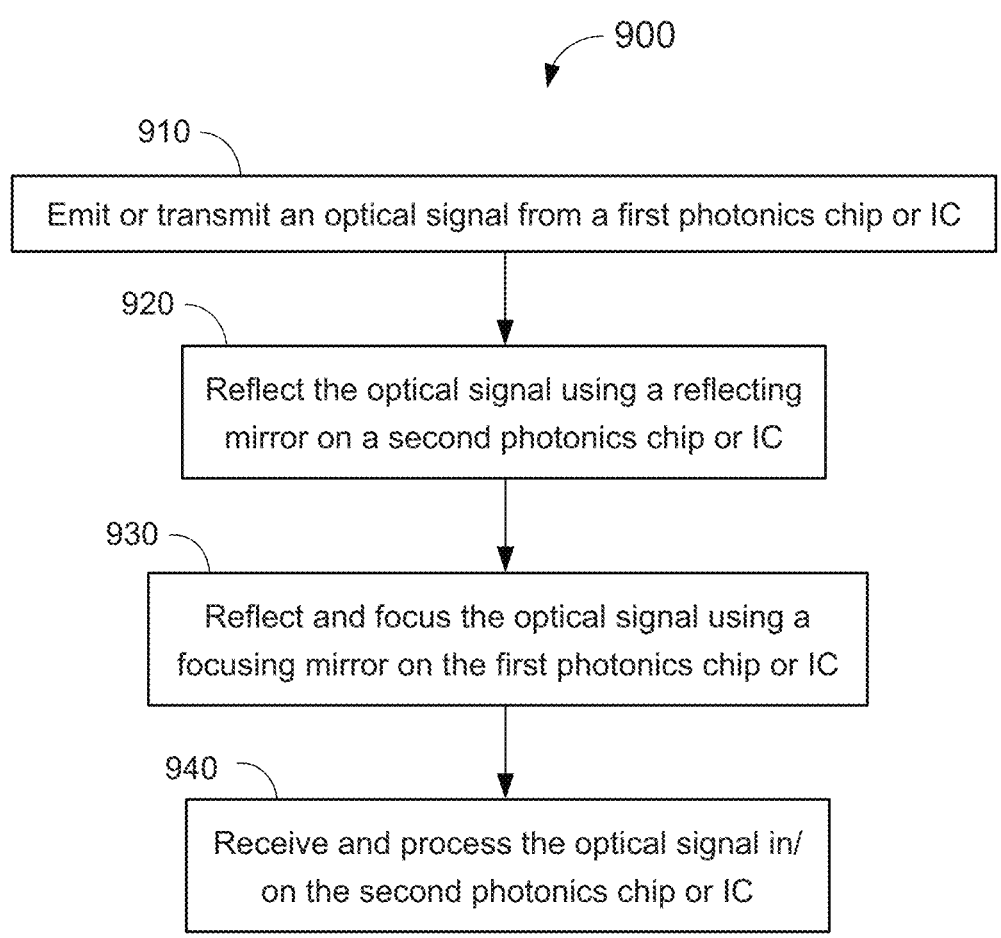

SYSTEM AND METHOD FOR TRANSFERRING OPTICAL SIGNALS IN PHOTONIC DEVICES AND METHOD OF MAKING THE SYSTEM

CROSS REFERENCE TO RELATED APPLICATION

This application is a national phase application of PCT Application No. PCT/US19/23547, filed on Mar. 22, 2019, incorporated herein by reference as if fully set forth herein.

FIELD OF THE INVENTION

The present invention relates to the field of optical or optoelectronic transmitters, and particularly to optical modulators configured to modulate a continuous light beam to be output as an optical signal by an optical or optoelectronic transmitter.

DISCUSSION OF THE BACKGROUND

Optical or optoelectronic transceivers (which may be generally identified as "optical transceivers") convert electrical signals into optical signals and optical signals into electrical signals. An optical transceiver may include receiver and transmitter optical subassemblies, functional circuits, and electrical and optical interfaces, and are significant components in optical fiber communication systems and data storage networks.

In general, photonics is a field relating to light (photon) generation, detection, and manipulation through emission, transmission, modulation, signal processing, switching, amplification, and/or sensing. One goal of photonics is to use light to perform functions that traditionally fall within the domain of electronics, such as telecommunications, information processing, etc. Thus, photonic applications use photons in largely the same way that electronic applications use electrons.

Devices that use light as an information carrier have a number of advantages over those that use electricity. For example, light may travel at a speed that is about an order of magnitude (e.g., about 10 times) greater than the typical speed of electricity, which means (among other things) that data transmitted photonically can travel long distances in a fraction of the time that electrical signals need to travel the same distance. Furthermore, unlike electric currents, light beams in various bands (e.g., visible light and infrared [IR] light) pass through each other without interacting, so they do not interfere with each other. For example, a single optical fiber has the capability to carry up to three million telephone calls simultaneously.

However, coupling light between two optical chips can be challenging. For example, waveguides on silicon photonics chips and laser chips typically have micron or submicron minimum or correctional dimensions. On the other hand, the mode size or beam width of light emerging from conventional waveguides is a few microns in diameter. Thus, misalignment of light passing from one optical chip to another can be a challenging problem to solve.

In the field of photonics, a "1 dB alignment tolerance" is the maximum misalignment that keeps the coupling efficiency between the two chips (or between a chip and another structure, such as an optical fiber) within 1 dB of the peak efficiency. Typically, the 1 dB alignment tolerance between two photonic devices is only 1-2 microns (μm). Active alignment of the photonic devices can ensure compliance with a specification requiring a certain 1 dB alignment tolerance.

"Active alignment" refers to a process in which one or more devices are temporarily held in place (e.g., with a clamp or uncured adhesive) while one or more other devices are either fixed or temporarily held in place, a measurement is made of the amount of light transmitted from an origin to a target, one of the temporarily-held devices is repositioned, the measurement is made again, and an improvement or deterioration in the alignment of the devices is determined. The process is repeated until a desired or threshold level of confidence in the positions of the devices corresponding to the best measurement(s) is achieved, and the devices are then permanently fixed in those positions.

However, active alignment of photonic devices typically requires tools and procedures that may be relatively complicated and/or that may be less than ideal. Thus, active alignment of photonic devices can have a relatively high cost and/or a relatively low throughput.

FIG. 1 shows a cross-section of a conventional chip-to-chip coupling scheme 100, in which a first photonic device (e.g., a laser or laser diode chip) 110 emits or transmits light 125a to a second photonic device (e.g., a waveguide or light processing chip) 140. The light 125a may be emitted from or transmitted through a light output mechanism 120. The light output mechanism 120 may be or include a laser diode or a grating coupler (which may receive the light from a waveguide in the first photonic device 110). The light 125a is focused by a lens 130. The focused light 125b is received by a light receiving mechanism 150. The light receiving mechanism 150 may be or include a second grating coupler, a mirror or other reflective surface, or a photodiode.

However, problems exist in the scheme 100. For example, a small change in the position of the lens can have a relatively large effect on the location of the focal point of the focused light 125b. For example, FIG. 2 shows a cross-section of a chip-to-chip coupling system 200, including a light transmitting chip 210 and a light receiving chip 240. The light transmitting chip 210 transmits a light beam 215 from a grating coupler or emitter 220. The emitted light passes through a lens 230, and the focused light 235 is received by a grating coupler or detector 250 in the light receiving chip 240. The light transmitting chip 210 and the light receiving chip 240 are spaced apart by a distance D.

FIG. 3A shows a cross-section of a model 300 for the system 200, including a light emitter 310, a spherical focusing lens 320, and a light detector 330. The light emitter 310 and the light detector 330 are separated by a distance D of 200 μm. Each of the light emitter 310 and the light detector 330 have a round shape in a plan (or top-down) view, with a diameter of 9.2 μm. The lens 320 has a diameter of 43 μm.

FIG. 3B is a graph 350 showing the coupling tolerance of the light emitter 310 and the light detector 330 through the lens 320. The curve 360 is the coupling loss (in dB) of the system 300 as a function of misalignment of the light detector 330 in either the x direction or the z direction (in μm). The dashed lines 370a-b show that the simulated 1 dB alignment tolerance of the model 300 (FIG. 3A) is 2.3 microns (μm).

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

In one aspect, the present invention relates to a system, comprising a first photonics chip or integrated circuit (IC) having an optical emitter or optical transmission mechanism thereon, a second photonics chip or IC having an optical receiver thereon, a reflecting mirror on the second photonics chip or IC, and a focusing mirror on the first photonics chip or IC. The reflecting mirror is configured to reflect light transmitted by the optical emitter or optical transmission mechanism back to the first photonics chip or IC. The focusing mirror is configured to (i) further reflect the light reflected by the reflecting mirror and (ii) focus the further reflected light on the optical receiver.

In some embodiments, the optical emitter or optical transmission mechanism comprises the optical emitter. The optical emitter may comprise a laser diode.

In other embodiments, the optical emitter or optical transmission mechanism comprises the optical transmission mechanism. The optical transmission mechanism may comprise a first grating coupler or a first reflective surface. In such embodiments, the system further may comprise a first waveguide in the first photonics chip or IC. The first waveguide may be (i) configured to carry the optical signal and/or (ii) optically coupled to the grating coupler or the reflective surface.

In some embodiments, the optical receiver comprises a photodiode. Alternatively, the optical receiver may comprise a second grating coupler or a second reflective surface. When the optical receiver comprises a grating coupler or reflective surface, the system may further comprise a second waveguide in the second photonics chip or IC. The second waveguide may be (i) optically coupled to the second grating coupler or the second reflective surface and/or (ii) configured to carry the optical signal (e.g., in the second photonics chip or IC).

In other or further embodiments, the focusing mirror and/or the reflecting mirror may comprise a concave depression or indentation in the respective first or second photonics chip or IC. Alternatively, the focusing mirror and/or the reflecting mirror may comprise (i) a planar reflecting surface on the respective first or second photonics chip or IC and (ii) a lens on or above the planar reflecting surface. When the lens is above the planar reflecting surface, the focusing mirror and/or the reflecting mirror further comprise a physical support structure integrated with and/or connected to the lens and the respective first or second photonics chip or IC.

In another aspect, the present invention relates to a method of transferring light, comprising emitting or transmitting light from an optical emitter or optical transmission mechanism on a first photonics chip or IC, reflecting the light back to the first photonics chip or IC using a reflecting mirror on a second photonics chip or IC, further reflecting the light to and focusing the reflected light on a light receiver on the second photonics chip or IC using a focusing mirror on the first photonics chip or IC, and receiving the further reflected and focused light at the optical receiver. In some embodiments, the light is emitted or transmitted from the optical emitter or optical transmission mechanism to the reflecting mirror, and/or the reflecting mirror reflects the light to the focusing mirror.

In some embodiments, the light is transmitted by the optical transmission mechanism, and the method may further comprise carrying the light in a first waveguide in the first photonics chip or IC before transmitting the light from the optical transmission mechanism. Similarly, in other or further embodiments, the method may further comprise carrying the light in a second waveguide in the second photonics chip or IC after receiving the light at the optical receiver.

In yet another aspect, the present invention relates to a method of manufacturing a light transfer system, comprising forming or making an optical emitter or transmission mechanism and a focusing mirror on a first photonics chip or IC, forming or making a light receiver and a reflecting mirror on a second photonics chip or IC, and positioning the first photonics chip or IC and the second photonics chip or IC such that light emitted or transmitted by the optical emitter or transmission mechanism is (i) reflected by the reflecting mirror towards a first target on the first photonics chip or IC, (ii) further reflected and focused by the focusing mirror, and (iii) received by or at the light receiver.

In some embodiments, the first target is the focusing mirror, and/or the focusing mirror directs the light to the light receiver. In other or further embodiments, the method may further comprise forming a lens on or above at least one of the focusing mirror and the reflecting mirror.

Alternatively or additionally, the method may further comprise forming a waveguide in at least one of the first and second photonics chips or ICs. The waveguide may be optically coupled to (i) the optical transmission mechanism when the waveguide is formed in the first photonics chip or IC, or (ii) the optical receiver when the waveguide is formed in the second photonics chip or IC.

The present invention advantageously increases alignment tolerances or margin in chip-to-chip light transfers, generally by more than 5 times. The present system can reduce or cancel the impact of the misalignment parallel to the surfaces of the photonics chips/ICs, in many cases sufficiently to enable passive alignment (e.g., fixing the photonics chips/ICs in predetermined locations that have been previously determined empirically to result in alignment of the optical components on different chips). Relative to active alignment, passive alignment has a low cost and a high throughput.

Furthermore, all components can be integrated on either of the photonics chips, and can thus be fabricated with high accuracy and low cost. For example, the optical emitter/ transmitter and the optical receiver can have the same design (e.g., the same polarization) and a well-matched mode profile, which can reduce or minimize mode mismatch and increase or maximize coupling efficiency. For example, most on-chip waveguides have a rectangular cross-section. As a result, the mode profile of on-chip waveguides approximates a rounded-corner rectangle. In addition, the polarization in on-chip waveguides is generally fixed, simplifying maintaining the polarization of the optical signal, reducing mode profile mismatch, and enabling high coupling efficiency. Finally, a mechanism that can eliminate a non-integrated lens in such device-to-device light transfers can simply the photonics system assembly process and/or reduce costs.

These and other features and advantages of the present invention will become readily apparent from the detailed description of various embodiments below.

BRIEF DESCRIPTION OF THE DRAWINGS

FIGS. 5A-B are graphs showing the simulated coupling tolerance (including the 1 dB alignment tolerance) for the exemplary chip-to-chip photonics system of FIG. 4 in accordance with one or more embodiments of the present invention.

FIGS. 6A-D show exemplary optical transmission-reception systems in accordance with embodiments of the present invention.

FIGS. 7A-B show exemplary optical waveguides suitable for use with embodiments of the present invention.

FIGS. 8A-C show exemplary mirrors suitable for use with embodiments of the present invention.

FIG. 9 is a flow chart for an exemplary method of transferring light from a first photonics device to a second photonics device in accordance with one or more embodiments of the present invention.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures and components have not been described in detail so as not to unnecessarily obscure aspects of the present invention. Furthermore, it should be understood that the possible permutations and combinations described herein are not meant to limit the invention. Specifically, variations that are not inconsistent may be mixed and matched as desired.

For the sake of convenience and simplicity, the terms "transceiver," "optical transceiver" and "optoelectronic transceiver" may be used interchangeably, as may the terms "optical" and "optoelectronic," the terms "connected to," "coupled with," "coupled to," and "in communication with" (which include both direct and indirect connections, couplings and communications), the terms "mounting," "affixing," "attaching" and "securing" (and grammatical variations thereof), and the terms "data" and "information," but these terms are generally given their art-recognized meanings.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases (e.g., cylindrical structures such as optical fibers and certain other optical waveguides). A "major surface" refers to a surface defined by the two largest dimensions of a given structure or feature, which in the case of a structure or feature having a partially or completely circular or spherical surface, may be defined by the radius of the circle or sphere.

An Exemplary Chip-to-Chip Light Transfer System

Figure 4:
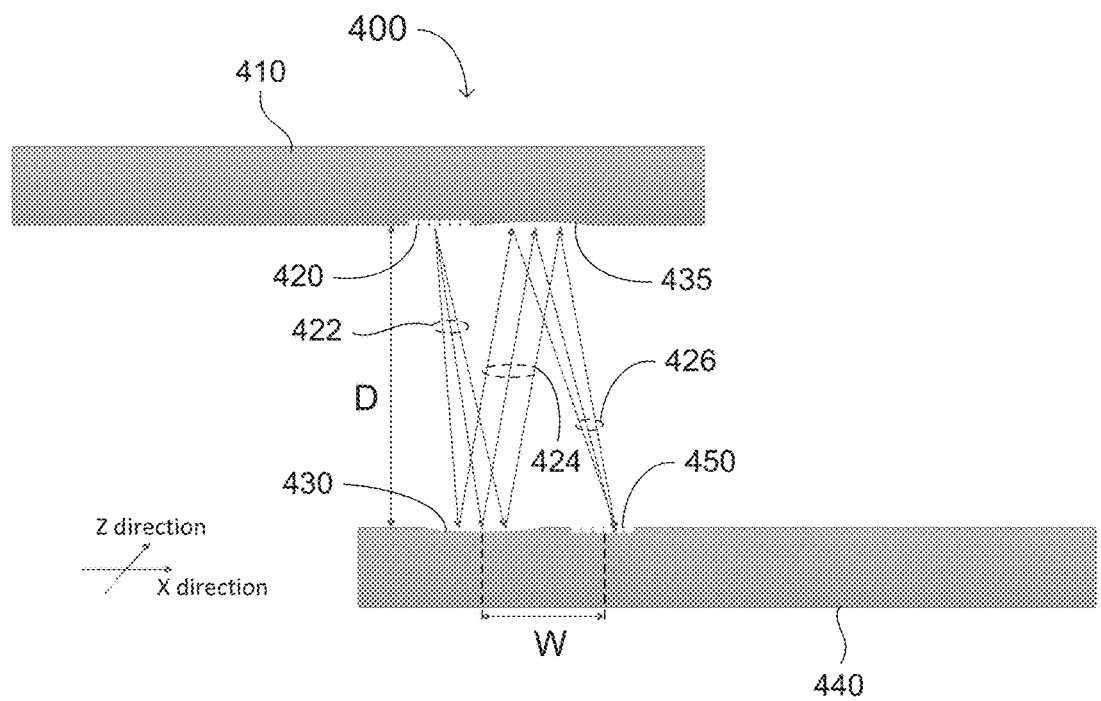
FIG. 4 shows an exemplary chip-to-chip photonics system configured to transfer a light beam from one photonics chip to another in accordance with one or more embodiments of the present invention.

FIG. 4 shows an exemplary chip-to-chip light transfer system 400 including a first photonics chip or integrated circuit (IC) 410 and a second photonics chip or IC 440. The first photonics chip or IC 410 comprises an optical emitter or transmitter 420 and a focusing mirror 435, and the second photonics chip or IC 420 comprises an optical receiver or detector 450 and a reflecting mirror 430. The first photonics chip or IC 410 is configured to emit or transmit a light beam 422 to the second photonics chip or IC 420, and the second photonics chip or IC 420 is configured to receive a reflected, focused light beam 426 from the first photonics chip or IC 410. The light beam 422 (which may comprise an optical signal carrying data and overhead or other information) is emitted or transmitted to the reflecting mirror 430, which is configured to reflect the light beam (in the form of reflected light beam 424) to the focusing mirror 435. The focusing mirror 435 is configured to reflect and focus the reflected light beam (in the form of the reflected, focused light beam 426) to the optical receiver or detector 450.

Each of the first and second photonics chips or ICs 410 and 440 may comprise a monolithic silicon, germanium, gallium arsenide, indium phosphide, zinc oxide, zinc sulfide, cadmium selenide, or other Group IV, Group III-V, or Group II-VI semiconductor substrate, with one or more epitaxial (e.g., monocrystalline) or polycrystalline Group IV, Group III-V, or Group II-VI semiconductor layers or thin films thereon, which may be patterned and/or doped in a manner providing one or more waveguides thereon or therein, and optionally one or more insulator films or layers thereon or therein. For example, the first and second photonics chips or ICs 410 and 440 may comprise a plurality of waveguides (e.g., formed by ion implantation and annealing) in a conventional silicon-on-insulator substrate).

The optical emitter or transmitter 420 may comprise a grating coupler, a mirror or other reflector, or a laser diode (see, e.g., FIGS. 6A-D and the discussion thereof below). The grating coupler may be conventional, and may comprise a plurality or series of periodic notches, troughs, depressions or projections in a waveguide (see, e.g., FIG. 6B) such that light is diffracted by the notches, troughs, depressions or projections and constructively interferes in a direction toward a target (e.g., the reflecting mirror 430). Grating couplers are advantageous when polarization selectivity (e.g., the optical signal being transferred has a predetermined polarization type) is desired.

Alternatively, the reflector may comprise a mirror external to a waveguide (see, e.g., FIG. 6C) or a facet reflector in the waveguide (see, e.g., FIG. 6D). The mirror and facet reflector are configured to reflect the light beam towards the reflecting mirror 430.

The laser diode (see, e.g., FIG. 6A) may be a double heterostructure laser, a separate confinement heterostructure laser, a quantum well laser, a quantum cascade laser, an interband cascade laser, a distributed Bragg reflector laser, a distributed feedback laser, a vertical cavity laser, a vertical-cavity surface-emitting laser [VCSEL], a vertical external-cavity surface-emitting laser [VECSEL], an external-cavity diode laser, or other device that converts an electrical current or signal into light.

When the optical emitter or transmitter 420 comprises a grating coupler, the grating coupler may be round, oval, square, rectangular, hexagonal, octagonal, etc. The grating coupler may have width and length dimensions (or, alternatively, a diameter) of from 1 to 100 µm, or any length, width, diameter or range of lengths, widths, and/or diameters therein (e.g., a diameter of from 5 to 20 µm). The light 422 may have an axis of from 0° to 45° from normal (i.e., from a line between and perpendicular to the first and second photonics chips or ICs 410 and 440) in the X direction, or any angle or range of angles therein (e.g., from 5° to 25°). The light 422 may also have a beam spread of from, e.g., 1° to 15°, or any angle or range of angles therein.

Each of the reflecting mirror 430 and the focusing mirror 435 may comprise a shallow spherical depression or indentation in an uppermost or outermost surface of the first and second photonics chips or ICs 410 and 440, respectively. The depressions or indentations may comprise or be plated with a reflective material, such as a metal, in accordance with known techniques.

The reflecting mirror 430 and the focusing mirror 435 may have a shape and dimensions suitable for their respective functions. In some embodiments, the reflecting mirror 430 has dimensions (e.g., a depth, an arc and/or a radius or diameter) such that the reflected light 424 has a radius or diameter that neither increases nor deceases significantly (e.g., that has a constant width). Optionally, the reflecting mirror 430 may collimate (or preserve the prior collimation of) the reflected light 424.

The reflected light 424 is both further reflected by and focused by the focusing mirror 435. The focusing mirror 435 may thus have dimensions configured to provide both a reflecting function and a focusing function. In some cases, the reflecting mirror 430 and the focusing mirror 435 may have identical dimensions, but in other embodiments, the focusing mirror 435 may have an arc slightly greater than that of the reflecting mirror 430. Alternatively, the focusing mirror 435 may have a depth slightly greater than and/or a diameter slightly less than that of the reflecting mirror 430. The focusing mirror 435 generally focuses the further reflected light 426 onto a target, such as the optical receiver or detector 450.

For example, each of the reflecting mirror 430 and the focusing mirror 435 may have a diameter of from 10 to 200 µm, or any diameter or range of diameters therein (e.g., from 30 to 100 µm), and a depth of from 0.2 to 20 µm, or any depth or range of depths therein (e.g., from 1 to 10 µm). Alternatively, the reflecting mirror 430 and the focusing mirror 435 may have an arc of from 5° to 40°, or any angle or range of angles therein.

The optical receiver or detector 450 may comprise a grating coupler, a mirror or other reflector, or a photodiode. In some embodiments, the optical receiver or detector 450 may have an identical or substantially identical structure and/or dimensions as the optical emitter or transmitter 420, and the axes of the light 422 and the further reflected light 426 may be parallel. Thus, when the optical receiver or detector 450 comprises a grating coupler or a mirror or other reflector, the second photonics chip or IC 440 may comprise one or more waveguides in one or more epitaxial or polycrystalline semiconductor layers or thin films on a semiconductor substrate.

In addition, the center-to-center spacing between (i) the optical emitter or transmitter 420 and the focusing mirror 435 and (ii) the reflecting mirror 430 and the optical receiver or detector 450 may be identical. In the example shown in FIG. 4, this spacing may be determined by the formula 2D*tan α, where D is the distance between the first and second photonics chips or ICs 410 and 440, and α is the angle of the axis of the light 422. Thus, in some embodiments, both the reflecting mirror 430 and the focusing mirror 435 can focus the reflected light, and they may both have the same focusing distance. The system 400 may further comprise a spacer (not shown) to ensure accuracy of the distance D (e.g., within a certain error limit or margin). Thus, in embodiments in which the first photonics chip or IC 410 has a reflector 435 and the optical emitter or transmitter 420 on the same (e.g., uppermost) surface, and the second photonics chip or IC 440 has the reflector 430 and the optical receiver 450 on the same (e.g., uppermost) surface, the distance between the surfaces of the two chips or ICs 410 and 440 may equal the focusing distance of the reflectors 430 and 435. The light signal received at the light receiver or detector 450 may be subsequently processed by one or more conventional techniques.

Figure 1:
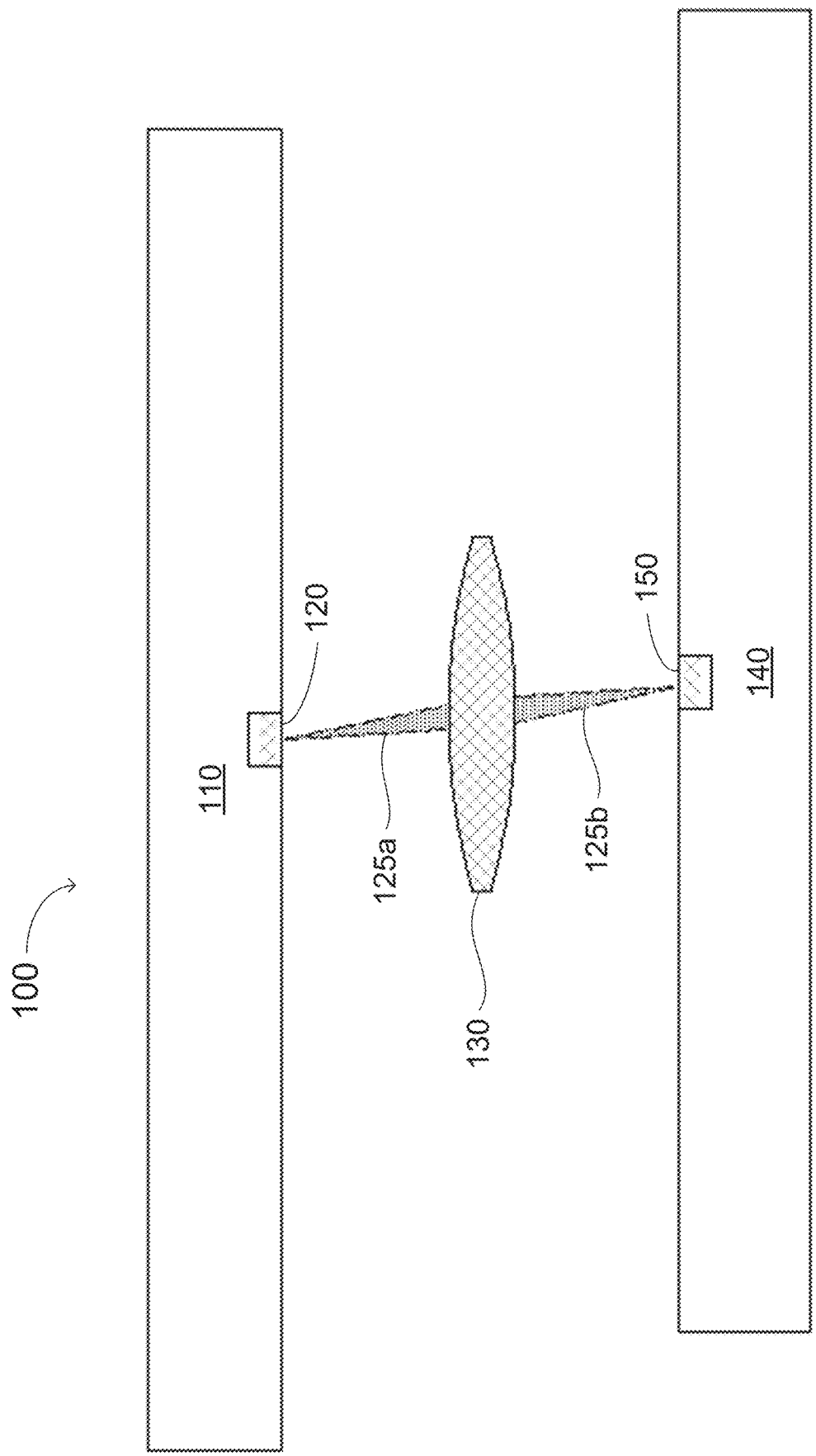
FIG. 1 shows a conventional chip-to-chip photonics system configured to transfer a light beam from one photonics chip to another.
Figure 2:
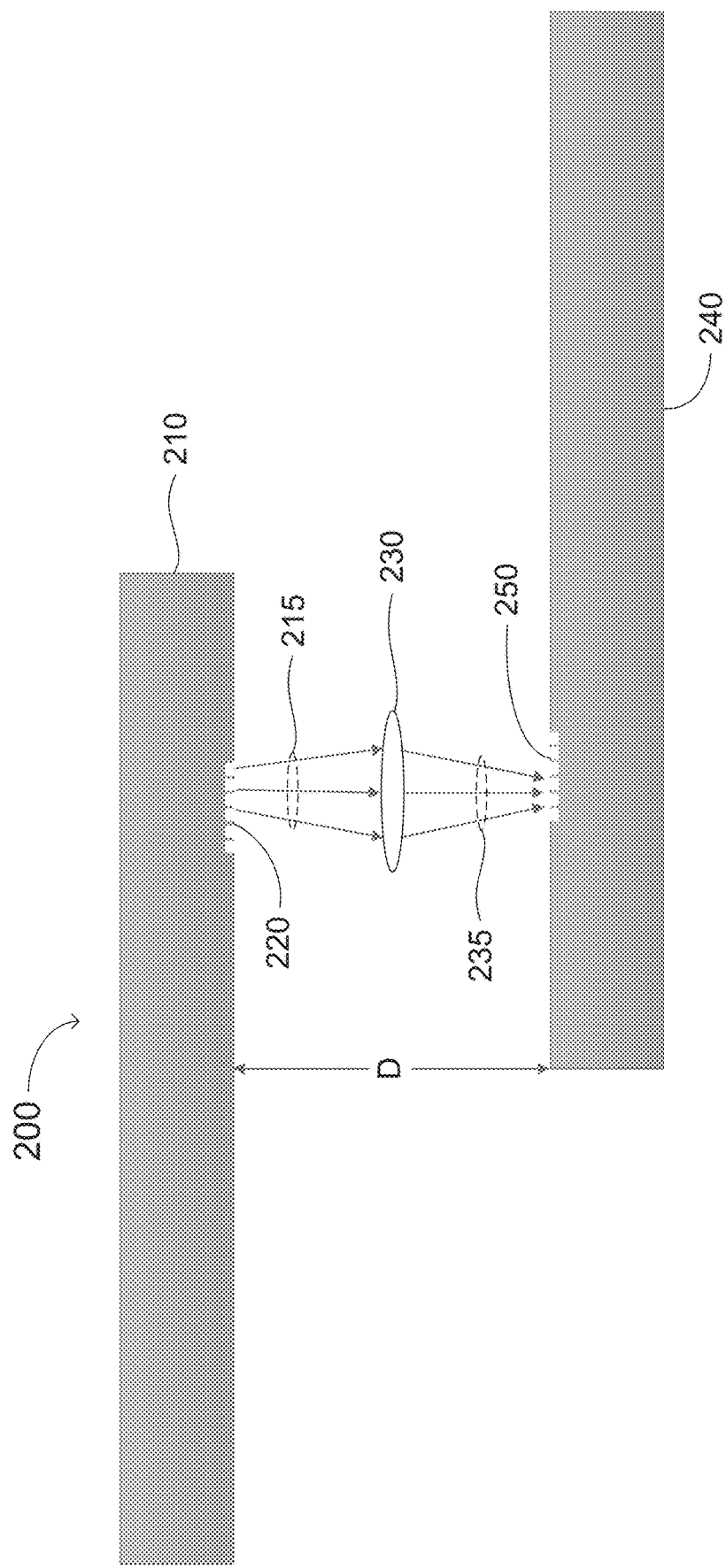
FIG. 2 shows an alternative conventional chip-to-chip photonics system configured to transfer a light beam from one photonics chip to another.
Figure 3:
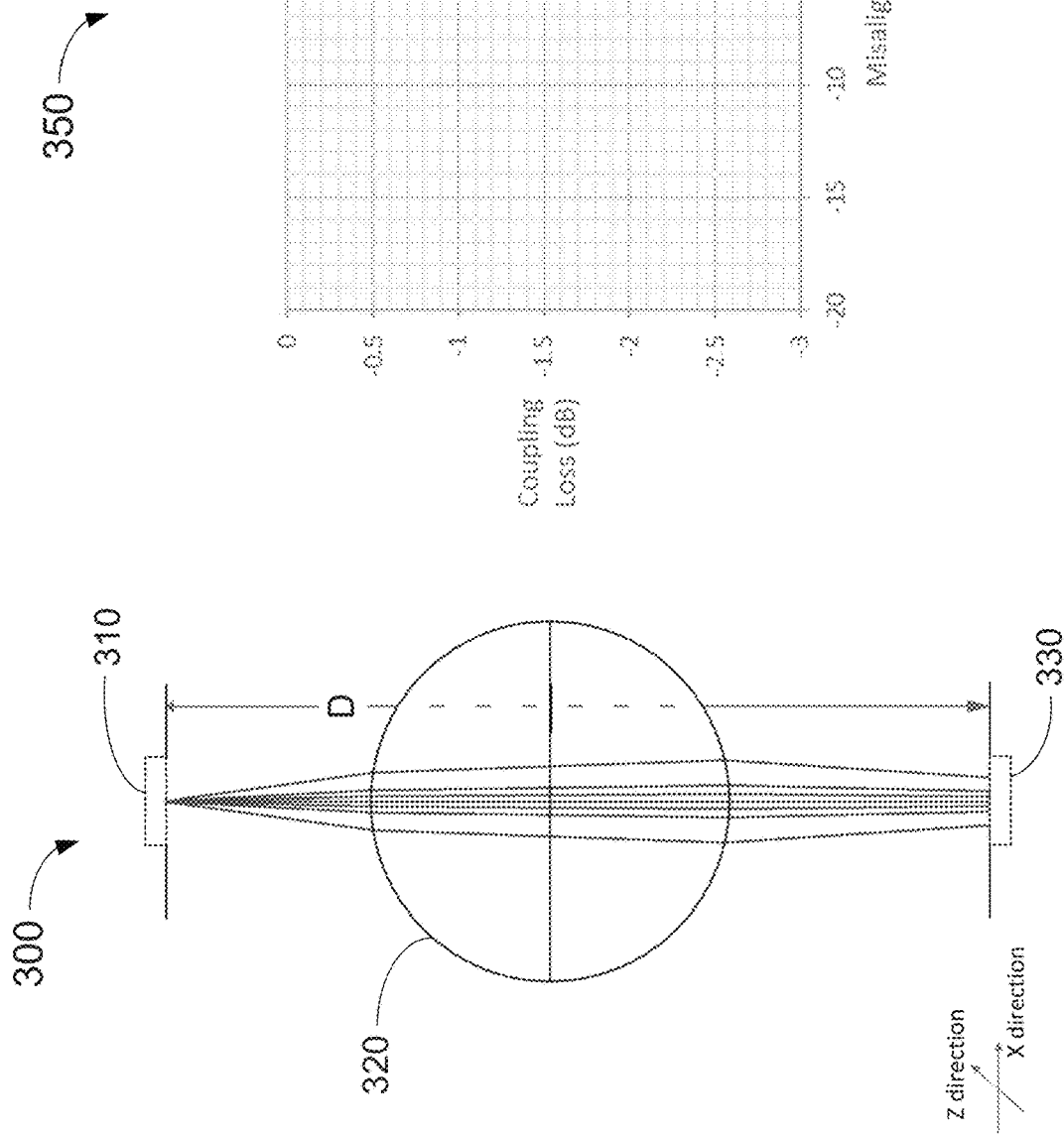
FIG. 3A shows a simplified model for the alternative conventional chip-to-chip photonics system of FIG. 2.
FIG. 3B is a graph showing the simulated coupling tolerance (including the 1 dB alignment tolerance) for the model of FIG. 3A.
Figure 5A:
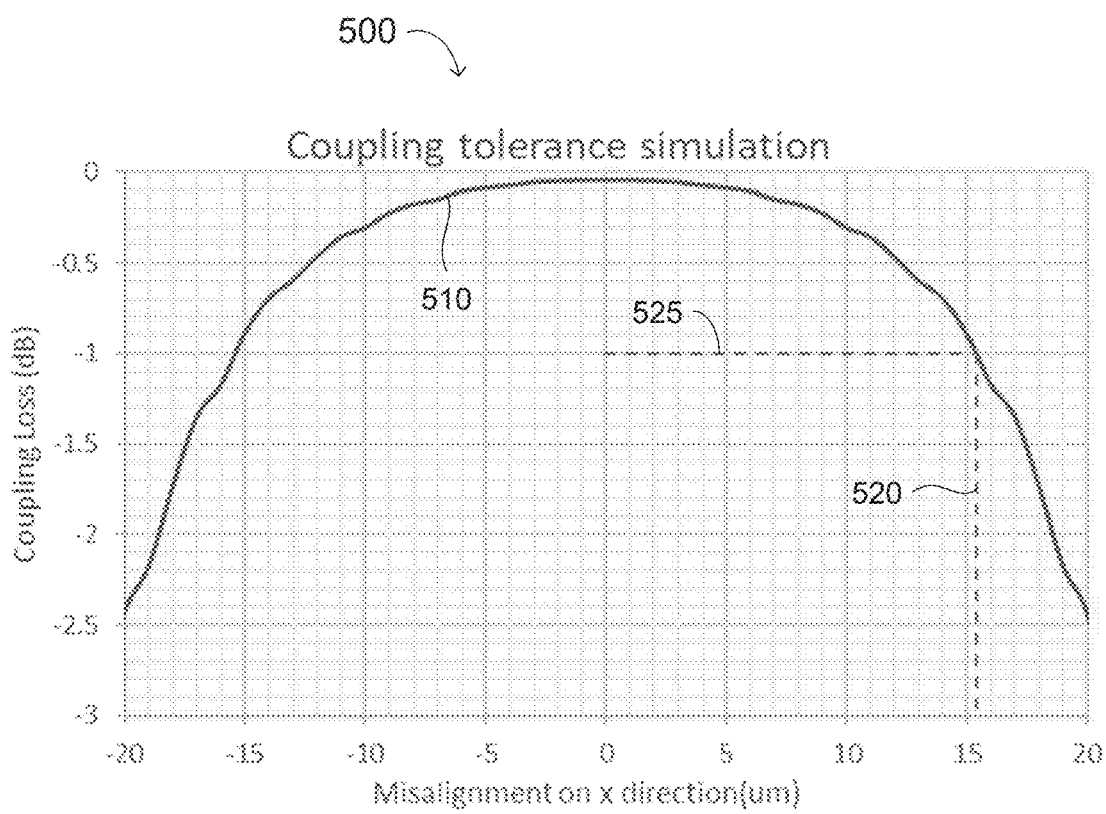

FIG. 5A is a graph 500 showing the simulated coupling tolerance 510 (including the 1 dB alignment tolerance 520) in the X direction (FIG. 4) in µm for the exemplary chip-to-chip photonics system 400 of FIG. 4. The simulations producing the results shown in FIGS. 5A-B include the same optical emitter, chip-to-chip spacing and light beam parameters as for the simulation producing the results shown in FIG. 3B. At a coupling loss of 1 dB (i.e., 1 dB less than the maximum signal strength of the light transmitted from the first photonics chip or IC 410 to the second photonics chip or IC 440, designated by the dashed horizontal line 525), the tolerance 520 is about 15.3 µm. This means that, in the model system 400 of FIG. 4, the photonics chips or ICs 410 and 440 can be misaligned in the X direction by up to about 15 µm with less than a 1 dB loss in signal strength. This result is more than 6 times better than the conventional system 200 in FIG. 2.

FIG. 5B is a graph 550 showing the simulated coupling tolerance 560 (including the 1 dB alignment tolerance 570) in the Z direction (FIG. 4) in µm for the exemplary chip-to-chip photonics system 400 of FIG. 4. At a coupling loss of 1 dB (designated by the dashed horizontal line 575), the tolerance 570 is about 15.0 µm. This means that, in the model system 400 of FIG. 4, the photonics chips or ICs 410 and 440 can be misaligned by up to 15 µm in the Z direction with no more than a 1 dB loss in signal strength. This result is also more than 6 times better than the conventional system 200 in FIG. 2.

Exemplary Optical Transmitter-Receiver Systems

FIGS. 6A-D show exemplary optical transmitter-receiver systems 600, 602, 604 and 608. Each of the exemplary optical transmitter-receiver systems 600, 602, 604 and 608 includes first and second photonics chips or ICs 610 and 620, but with different optical transmitting and receiving mechanisms.

FIG. 6A shows an exemplary optical transmitter-receiver system 600, including an optical emitter 612 on the first photonics chip or IC 610 and an optical receiver 622 on the second photonics chip or IC 620. The optical emitter 612 may comprise, for example, a laser diode or a light-emitting diode (LED). The optical receiver 622 may comprise, for example, a photodiode, a photosensor, or a photoresist. Each of the first and second photonics chips or ICs 610 and 620 may have an insulator and/or light-blocking layer 614 or 624 thereon, configured to expose the light-emitting or light-receiving portions of the optical emitter 612 or optical receiver 622, and protect the parts or regions of the first and second photonics chips or ICs 610 and 620 covered by the insulator and/or light-blocking layer 614 or 624.

The optical emitter 612 receives an electrical signal (not shown) and emits a light beam or signal 616 in response thereto. To encode data on the light beam or signal 626, the electrical signal may vary (e.g., correspond to digital or binary data states). Alternatively, the first photonics chip or IC 610 may further comprise an optical modulator (not shown) that modulates the light beam before emission (as an optical signal) from the first photonics chip or IC 610.

The light beam or signal 616 is then reflected by a mirror (e.g., mirror 430 in FIG. 4) on the second photonics chip or IC 620 towards a target on the first photonics chip or IC 610. Typically, the target is a reflecting and focusing mirror, but in some embodiments, the light receiving mechanism on the second photonics chip or IC 620 may be relatively distant from the light transmitting mechanism, and multiple reflections between the first and second photonics chips or ICs 610 and 620 may be implemented. Therefore, depending on the number of reflections between the first and second photonics chips or ICs 610 and 620, the target may be a second reflecting mirror. The second reflecting mirror on the first photonics chip or IC 610 may be identical or substantially identical to the reflecting mirror on the second photonics chip or IC 620.

The reflected light beam or signal (e.g., light beam or signal 424 in FIG. 4) is further reflected and focused by a mirror (e.g., reflecting and focusing mirror 435 in FIG. 4). The mirror further reflects the reflected light beam or signal towards the optical receiver 622 on the second photonics chip or IC 620, and may focus the further reflected light beam or signal on the optical receiver 622. The optical receiver 622 may then convert the further reflected light beam or signal that it receives to an electrical signal or use the received light to change a property or characteristic of one or more materials in the optical receiver 622.

FIG. 6B shows a second exemplary optical transmitter-receiver system 602, including a first waveguide 630 in the first photonics chip or IC 610, a first grating coupler 650 on the first photonics chip or IC 610, a second waveguide 640 in the second photonics chip or IC 620, and a second grating coupler 660 on the second photonics chip or IC 620. The insulator and/or light-blocking layers 614 and 624, which may be the same or substantially the same as in the system 600 in FIG. 6A, also provide a waveguide cladding function.

The first waveguide 630 carries a light beam or signal 632 to the first grating coupler 650, which reflects and/or refracts some or all of the light beam or signal 632 to a mirror (e.g., mirror 430 in FIG. 4) on the second photonics chip or IC 620, as described herein. The mirror on the second photonics chip or IC 620 towards a target on the first photonics chip or IC 610, as described above. When the target is a second mirror, the second mirror may further reflect (and optionally focus) the reflected light onto the second grating coupler 660 on the second photonics chip or IC 620. The second grating coupler 660 then reflects and/or refracts the further reflected light beam or signal 644 into the second waveguide 640 in the second photonics chip or IC 620, where the coupled light beam or signal 642 is then further processed (e.g., by optical processing hardware or circuitry, such as an optical modulator, an optical coupler, a photodiode, etc.).

FIG. 6C shows a third exemplary optical transmitter-receiver system 604, including a first waveguide 635 in or on the first photonics chip or IC 610, a first planar mirror 670 in or on the first photonics chip or IC 610, a second waveguide 645 in the second photonics chip or IC 620, and a second planar mirror 680 on the second photonics chip or IC 620. The optical transmitter-receiver system 604 further includes second insulator and/or light-blocking layers 618 and 628, which may provide some mechanical support for the first and second planar mirrors 670 and 680 (e.g., during manufacturing), in addition to light-blocking and/or electrical insulation functions for parts or portions of the first and second photonics chips or ICs 610 and 620 that do not include a waveguide. The insulator and/or light-blocking layers 614 and 624, which cover the first and second waveguides 635 and 645, respectively, are the same or substantially the same as in the systems 600 and 602 in FIGS. 6A-B.

In the optical transmitter-receiver system 604, light 632 transmitted through the first waveguide 635 is reflected by the first planar mirror 670 towards a target on the second photonics chip or IC 620. The first waveguide 635 generally has a facet at 0° relative to the plane that is normal or perpendicular to the optical axis of the light 632. The first planar mirror 670 generally comprises a quadrilateral mechanical support block and a total reflection mirror on the angled face of the quadrilateral support block. The first planar mirror 670 may reflect the light 632 at an angle of from 15° to 165° relative to the optical axis of the light 632, or any angle or range of angles therein (e.g., from 60° to 85°).

The target on the second photonics chip or IC 620 may be the second planar mirror 680, but other targets may be used instead (e.g., a photodiode or grating coupler, as disclosed herein). The second planar mirror 680 may be identical or substantially identical to the first planar mirror 670, but the invention is not limited thereto. Generally, however, when the light 634 reflected by the first planar mirror 670 is transmitted directly to the second planar mirror 680 (i.e., the reflected light 634 is also the transmitted light 644), the angle of the angled face of the second planar mirror 680 is equal to the angle of the angled face of the first planar mirror 670. However, additional mirrors or other reflective surfaces may further reflect or direct the reflected light 634 before the transmitted light 644 is received and/or reflected by the second planar mirror 680, in which case the angle of the angled face of the second planar mirror 680 may be different from the angle of the angled face of the first planar mirror 670. The transmitted light 644 is reflected by the second planar mirror 680 into the second waveguide 645 in the second photonics chip or IC 620, where it is further processed as described herein.

FIG. 6D shows a fourth exemplary optical transmitter-receiver system 606, including a first waveguide 636 in or on a first photonics chip or IC 615, a first planar mirror or facet 638 at an end of the first waveguide 636, a second waveguide 646 in the second photonics chip or IC 625, and a second planar mirror or facet 648 at an end of the second waveguide 646. The insulator and/or light-blocking layers 614 and 624, which cover the first and second waveguides 636 and 646, respectively, are the same or substantially the same as in the systems 600, 602 and 604 in FIGS. 6A-C.

In the optical transmitter-receiver system 606, light 632 transmitted through the first waveguide 636 is reflected by the first planar mirror or facet 638 towards a target on the second photonics chip or IC 625. The first mirror or facet 638 is at an angle of from 15° to 75° relative to the plane that is normal or perpendicular to the optical axis of the light 632, or any angle or range of angles therein (e.g., from 30° to 60°). The first planar mirror or facet 638 generally comprises a total reflection mirror, and may be formed by cutting, grinding or polishing the edge of the first photonics chip or IC 615 to expose the first waveguide 636 and form the surface thereof at a predetermined angle, and optionally, depositing a reflective material (e.g., a reflective metal or metal alloy) onto the angled edge to form the mirror or facet 638.

The target on the second photonics chip or IC 625 may be the second planar mirror or facet 648, but other targets may be used instead (e.g., a photodiode or grating coupler). The second planar mirror or facet 648 may be identical or substantially identical to the first planar mirror or facet 638, but the invention is not limited thereto. Generally, however, when the light 634 reflected by the first planar mirror or facet 638 is transmitted directly to the second planar mirror or facet 648 (i.e., the reflected light 634 is also the transmitted light 644), the angle of the second planar mirror or facet 648 is equal to the angle of the first planar mirror or facet 638. Alternatively, the angle of the second planar mirror or facet 648 may be complementary to the angle of the first planar mirror or facet 638 (e.g., the sum of the angles of the first and second mirrors/facets 638 and 648=90°). However, additional mirrors or other reflective surfaces may further reflect or direct the reflected light 634 before the transmitted light 644 is received and/or reflected by the second planar mirror or facet 648, in which case the angle of the second planar mirror or facet 648 may be different from the angle of the first planar mirror or facet 638. The transmitted light 644 is reflected by the second planar mirror or facet 648 into the second waveguide 646 in the second photonics chip or IC 625, where it is further processed as described herein.

An alternative of the optical transmitter-receiver system 606 may include one in which the first and second waveguides 636 and 646 include an angled mirror or facet 638 or 648 at a respective end thereof, but in which the substrate is not angled, and extends beyond the angled mirror or facet 638 or 648. In this alternative system, a substrate, an insulator and/or light-blocking layer similar or identical to the second insulator and/or light-blocking layers 618 and 628, and a quadrilateral dummy structure similar or identical to the first and second planar mirrors 670 and 680 shown in FIG. 6C are present. The first and second waveguides 636 and 646 (FIG. 6D) are formed on the quadrilateral dummy structures such that the angled ends 638 and 648 of the first and second waveguides 636 and 646 contact the angled surfaces of the dummy structures. The dummy structures can then be selectively etched to form reflective mirrors or facets similar or identical to the angled mirrors or facets 638 and 648, but with some structures providing additional mechanical support and/or protection to the angled mirror or facet at the end of each waveguide.

Exemplary Optical Waveguides

FIGS. 7A-B show cross-sections of exemplary optical waveguides suitable for use in the exemplary optical transmitter-receiver systems 600, 602, 604 and 606. Although the invention is not limited to the exemplary optical waveguides shown in FIGS. 7A-B, there are typically two types of optical waveguides having a structure as shown in FIGS. 7A-B. The different types of optical waveguides have different mechanisms for creating an effective reflective index difference between the core material and the cladding material to enable optical confinement in the core material.

In one type of optical waveguide, the core includes a high refractive index material, and the cladding includes a low refractive index material. Most or all of the core material (e.g., 90% or more of its length) is not doped, except in active devices such as a modulator or an attenuator (which may constitute 10% or less of the length of the core material), where doping-induced carriers are used to manipulate the light in the waveguide. For example, FIG. 7A shows an exemplary optical waveguide 700, including a silicon wafer substrate 710, an n-doped silicon layer 720, a p-doped silicon layer 725, and an overlying dielectric layer 740. The exemplary optical waveguide 700 in FIG. 7A includes a fin region 730 with a vertical p-n junction 735. The portions of the n-doped silicon layer 720 and the p-doped silicon layer 725 outside the fin region 730 function as electrodes for the waveguide, in which the vertical p-n junction 735 is the medium through which the light (e.g., the optical signals) are carried. Each of the electrodes may further comprise a metal contact through the dielectric layer 740 to an overlying metal wire or layer (not shown). The substrate 710 and the dielectric layer 740 function at least as cladding and optionally as mechanical support and/or passivation for the waveguide. Thus, the substrate 710 and the dielectric layer 740 may comprise materials having a refractive index lower than the materials in the fin region 730 of the waveguide 700. Consequently, the waveguide 700 shown in FIG. 7A may function as a waveguide or as an active device. In variations of the waveguide 700, the waveguide core 730 may comprise or consist essentially of undoped silicon or silicon nitride ($Si_3N_4$), and the cladding material (i.e., dielectric layer 740 and the uppermost layer of the substrate 710) may comprise or consist essentially of $SiO_2$, as in a conventional silicon photonics platform.

In another type of optical waveguide, the core and cladding include the same material, but the core is doped, resulting in a slightly higher refractive index. For example, FIG. 7B shows an exemplary alternative optical waveguide 700', including a glass (e.g., undoped silicon dioxide) substrate 710, a light-carrying region 760, and an overlying dielectric layer 745. The light-carrying region 760 comprises a doped glass (e.g., silicon oxide) layer, and the dielectric layer 745 includes an undoped glass (e.g., silicon dioxide), as in a conventional glass-based photonics integrated circuit. Alternatively, the light-carrying region 760 may comprise or consist essentially of silicon nitride, in which case the overlying dielectric layer 745 may comprise or consist essentially of doped or undoped silicon dioxide, and the substrate 710 may have an uppermost layer comprising or consisting essentially of doped or undoped silicon dioxide.

Typically, the cross-sectional area of the fin region 730 and the light-carrying region 760 has a height of from 100 nm to 1000 nm or any value or range of values therein (e.g., from 100 to 300 nm) and a width of from 200 nm to 10,000 nm or any value or range of values therein (e.g., from 1000 to 5000 nm).

Exemplary Mirrors

FIGS. 8A-C show exemplary reflecting and/or focusing mirrors 800, 802 and 804, suitable for use in the present chip-to-chip light transfer system. For example, FIG. 8A shows a reflecting and/or focusing mirror 800, comprising a concave depression, indentation or "dimple" 820 in a substrate 810. The substrate 810 is generally as described herein. The depression, indentation or dimple 820 may have a shape complementary to a spherical cap, spherical dome, or spherical segment, in which the maximum depth d of the depression, indentation or dimple 820 is much less than the radius r of the sphere corresponding to the spherical cap, spherical dome, or spherical segment (e.g., $d \leq r/n$, where n is a number of four [4] or greater, such as 5, 6, 8, 10 or more). The curved mirror 800 is advantageous for optical signals having multiple wavelengths of light (e.g., so-called multichannel optical signals).

The depression, indentation or dimple 820 may be formed in accordance with known techniques and/or plated with a reflective material, such as a metal, in accordance with known techniques (see, e.g., Hou, M. T.-K., et al., "Design and fabrication of surface-micromachined spherical mirrors," IEEE/LEOS International Conference on Optical MEMs, Lugano, Switzerland, Aug. 20-23, 2002, pp. 195-196, the relevant portions of which are incorporated herein by reference). Alternatively, a trench having a square, rectangular, hexagonal, octagonal or circular shape (in a plan view) with a width, length and/or diameter of 1-10 µm can be formed in accordance with known techniques (e.g., photolithographic patterning and etching of the substrate 810), filled with a relatively soft material (e.g., a metal such as aluminum, chromium, titanium, etc.), and polished using conventional mechanical or chemical-mechanical polishing, resulting in formation of a "dish" or substantially spherical depression in the material in the trench.

FIG. 8B shows a reflecting and/or focusing mirror 802, comprising a convex lens 830 having a dome-shaped or otherwise curved surface 832 on a substrate 812. The lens 830 is transparent or substantially transparent to the light being transferred from one photonics chip to another. The surface of the substrate 812 reflects the light, and thus the substrate 812 may have a reflective material, such as a metal, on its uppermost and/or outermost surface. In such embodiments, the combination of the substrate 812 and the lens 830 function as a focusing mirror. The lens 830 generally has a refractive index greater than air, in which case the light is refracted at the surface 832 and is optionally focused by the lens, before and/or after being reflected by the substrate 812. Thus, the lens 830 may be advantageous for monochromatic (i.e., single-wavelength) light, as the lens 830 may introduce undesired dispersion in light having multiple wavelengths (e.g., multi-channel optical signals).

The substrate 812 is generally as described herein, but has a planar surface on which the lens 830 is mounted or otherwise formed. The lens 830 may have a shape of or similar to a spherical cap, spherical dome, or spherical segment, in which the edges may be removed to form one or more sidewalls 834. In such embodiments, the lens 830 may have a maximum thickness t that is much smaller than the radius r of the sphere corresponding to the spherical cap, spherical dome, or spherical segment (e.g., $t \leq r/n$, where n is a number of four [4] or greater, such as 5, 6, 8, 10 or more). The lens 830 may be formed in accordance with known techniques. For example, a conventional photoresist that is transparent to the wavelength(s) of light being transferred may be conventionally deposited and patterned, then heated to its reflow temperature to soften and/or round the corners of the patterned photoresist, resulting in a lens having a curved upper surface. Alternatively, the curved upper surface of the patterned photoresist can be transferred to an underlying transparent dielectric material (e.g., silicon dioxide) by non-selective, anisotropic dry etching.

FIG. 8C shows an alternative reflecting and/or focusing mirror 804, comprising a convex lens 830' having a dome-shaped or otherwise curved surface 832' on a substrate 814 and in and/or over a trench 825 in the substrate 814. The substrate 814 is as described with respect to FIG. 8B, except that the trench 825 is conventionally formed in the substrate 814. For example, the trench 825 may be formed by photolithographic patterning and dry etching such that the corners of the substrate 814 at the top of the trench 825 are rounded. The lens 830' may have a shape of or similar to a spherical cap, spherical dome, or spherical segment, which may be truncated as in the reflecting and/or focusing mirror 802 of FIG. 8B. In such an embodiment, the light may be refracted at one or both of the planar surface 836 and the curved surface 832' of the lens 830', before and/or after being reflected by the substrate 814.

The lens 830' may be formed separately, and placed on the substrate 814 in or over the trench 825 by known techniques (e.g., sheet-to-wafer placement and transfer, pick-and-place processing [for sufficiently large lenses 830'] etc.). An adhesive may be deposited on the substrate 814 at the edges or periphery of the trench 825 and or the lens 830' prior to placement of the lens 830' on the substrate 814.

The lens 830' may have a width and length (or diameter) slightly greater than the trench 825. The trench 825 may have a depth greater than the distance by which the curved surface 832' extends the thickness of the lens 830' beyond its thickness at the sidewalls 834. Alternatively, the lens 830' may be supported by vertical support structures (not shown) to which the lens 830' may be attached or adhered (e.g., as shown in FIG. 8C or, alternatively, at its sidewalls 834), as described herein and/or in accordance with known techniques.

An Exemplary Method of Transferring an Optical Signal from a First Photonics Chip/IC to a Second Photonics Chip/IC FIG. 9 is a flowchart 900 showing an exemplary method of transferring an optical signal from one photonics chip or IC to another. For example, at 910, an optical signal is emitted or transmitted an optical signal from a first photonics chip or IC, as described herein. For example, the optical signal may be emitted from a laser diode or other optical signal generator on the first photonics chip or IC. Alternatively, the optical signal may be transmitted from a grating coupler or reflective surface on the first photonics chip or IC. The optical signal is generally emitted or transmitted to a target on a second photonics chip or IC, such as a reflective (or reflecting) mirror, as described herein.

At 920, the optical signal is reflected by a reflecting mirror on the second photonics chip or IC, as described herein. Optionally, the reflecting mirror may also focus the optical signal. The optical signal is generally reflected to a target on the first photonics chip or IC, such as a focusing mirror, as described herein.

At 930, the optical signal is reflected and focused by a focusing mirror on the first photonics chip or IC. Thus, the focusing mirror may also be a focusing and reflecting mirror. The focusing mirror reflects the optical signal towards and focuses the optical signal on a second target on or in the second photonics chip or IC, such as a grating coupler, a reflective surface, or a photodiode, as described herein.

Alternatively, the second target on the second photonics chip or IC may be or comprise a second reflecting mirror. Optionally, the second reflecting mirror may be or comprise a focusing and reflecting mirror. In such an alternative, the second reflecting mirror reflects the optical signal to a second mirror on the first photonics chip or IC. The second mirror on the first photonics chip or IC as may be or comprise a second focusing mirror or a focusing and reflecting mirror, as described herein. The number of mirror pairs reflecting the optical signal between the first and second photonics chips or ICs may depend on the positions of and spacing between the first and second photonics chips or ICs, the angle(s) of the second photonics chip or IC relative to the first photonics chip or IC, etc.

In a further alternative, when additional mirror pairs (i.e., beyond the reflecting mirror on the second photonics chip or IC and the focusing mirror on the first photonics chip or IC) are present, one or more of the mirrors may be on structures other than the first or second photonics chip or IC. For example, when the first and second photonics chips or ICs are housed in an optical or optoelectronic transceiver, one or more of the mirrors may be on a substrate or mounting surface in the optical or optoelectronic transceiver. In some embodiments, the surface on which the one or more mirrors is/are located is parallel to the surface of the corresponding first or second photonics chip or IC.

At 940, the optical signal is received in or on the second photonics chip or IC, and processed by other components in or on the second photonics chip or IC. For example, the optical signal may be received by or at a grating coupler, a reflective surface, or a photodiode. When the optical signal may be received by the grating coupler or is reflected by the reflective surface, the optical signal may be transferred to a waveguide in the second photonics chip or IC. The optical signal may travel in the waveguide to another component in the second photonics chip or IC for further processing, such as a photodiode, an optical coupler, an optical phase shifter, a modulator, combinations thereof, etc.

An Exemplary Method of Manufacturing a Chip-to-Chip Optical Signal Transfer System The present optical signal transfer system is advantageously implemented as first and second photonic integrated circuits (PICs). For example, some or all of the components of the present optical signal transfer system may be formed in first and second silicon PICs (Si PICs). Accordingly, the present invention also relates to a method of manufacturing an optical signal transfer system, comprising forming an optical transmitter or emitter and a first mirror on or in a first photonic integrated circuit, forming an optical receiver and a second mirror on or in a second photonic integrated circuit, and mounting or securing the first and second photonic integrated circuits face-to-face, such that an optical signal from the optical transmitter or emitter is reflected by the second mirror, the reflected optical signal (directly or indirectly from the second mirror) is focused and further reflected by the first mirror, and the focused and further reflected optical signal is received by the optical receiver.

Preferably, as many of the components of the optical signal transfer system are formed on the first and second PIC substrates as possible. Thus, in various embodiments, the method of manufacturing may further include forming a respective waveguide in each of the first and second PICs, forming a cladding layer and/or passivation on or over the waveguide(s), forming a mirror at adjacent to an end of the waveguide(s), forming a grating coupler on or over the waveguide(s), forming a lens on or above one or more of the mirrors, forming a laser diode in the first PIC, and/or forming a photodiode in the second PIC. If the lens is formed above the mirror(s), the method further comprises forming, mounting or attaching a physical support structure on the PIC adjacent to the mirror, and attaching the lens to or integrating the lens in the physical support structure.

In further embodiments, a complex or multi-channel optical signal transfer system may include multiple chip-to-chip optical signal transfer sub-systems. For example, the first PIC may include a plurality (e.g., 2, 4, 8 or more) of optical signal emitters or transmitters and an equal number of focusing mirrors, and the second PIC may include numbers of reflecting mirrors and optical signal receivers equal to the number of optical signal emitters or transmitters. Alternatively, the optical signal emitter or transmitter-focusing mirror pairs may be on separate first PICs, and the optical signal receiver-reflecting mirror pairs may be on separate second PICs. In general, each of the optical signal emitters or transmitters in the multi-channel optical signal transfer system emits or transmits a different wavelength of light. The different wavelengths of light may differ by at least 4 nm (e.g., 8 nm, 20 nm, etc.).

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system, comprising:
a first photonics chip or integrated circuit (IC) having an optical transmission mechanism thereon, the optical transmission mechanism comprising (i) a first waveguide and (ii) a first grating coupler, wherein:
the first waveguide is configured to carry an optical signal and is optically coupled to the grating coupler,
the first waveguide comprises an n-doped layer, a p-doped layer, and an overlying dielectric layer,
the n-doped layer and the p-doped layer form a p-n junction, and
the first waveguide has a height of from 100 nm to 1000 nm and a width of from 200 nm to 10,000 nm;
a second photonics chip or IC having an optical receiver thereon, the optical receiver comprising (i) a photodiode, (ii) a photosensor, or (iii) a second waveguide and either (1) a second grating coupler or (2) a reflective surface, the second waveguide having a height of from 100 nm to 1000 nm and a width of from 200 nm to 10,000 nm;
a reflecting mirror on the second photonics chip or IC, configured to reflect the optical signal back to the first photonics chip or IC; and
a focusing mirror on the first photonics chip or IC, configured to (i) further reflect the optical signal and (ii) focus the further reflected optical signal on the optical receiver.

2. The system of claim 1, wherein the first photonics chip or IC further comprises a laser diode.

3. The system of claim 1, wherein the optical receiver comprises the photodiode.

4. The system of claim 1, wherein the optical receiver comprises the second grating coupler and the second waveguide.

5. The system of claim 4, wherein the second waveguide is (i) optically coupled to the second grating coupler or the reflective surface and (ii) configured to carry the optical signal.

6. The system of claim 1, wherein each of the focusing mirror and the reflecting mirror comprises a concave depression or indentation in the respective first and second photonics chips or ICs.

7. The system of claim 1, wherein each of the first and second photonics chips or ICs comprise a monolithic silicon, germanium, gallium arsenide, indium phosphide, zinc oxide, zinc sulfide, cadmium selenide, or other Group IV, Group III-V, or Group II-VI semiconductor substrate, with one or more epitaxial, monocrystalline or polycrystalline Group IV, Group or Group II-VI semiconductor layers or thin films thereon, patterned and/or doped in a manner providing one or more waveguides thereon or therein.

8. The system of claim 1, wherein the first grating coupler comprises a plurality or series of periodic notches, troughs, depressions or projections in the first waveguide.

9. The system of claim 1, wherein the width of each of the first and second waveguides is independently from 200 nm to 5000 nm.

10. A method of transferring light, comprising:
   emitting or transmitting light from an optical transmission mechanism on a first photonics chip or integrated circuit (IC), the optical transmission mechanism comprising (i) a first waveguide and (ii) a first grating coupler, wherein:
      the first waveguide is configured to carry an optical signal and is optically coupled to the grating coupler,
      the first waveguide comprises an n-doped layer, a p-doped layer, and an overlying dielectric layer,
      the n-doped layer and the p-doped layer form a p-n junction, and
      the first waveguide has a height of from 100 nm to 1000 nm and a width of from 200 nm to 10,000 nm;
   using a reflecting mirror on a second photonics chip or reflecting the optical signal back to the first photonics chip or IC;
   using a focusing mirror on the first photonics chip or IC, further reflecting the optical signal to and focusing the reflected optical signal on an optical receiver on the second photonics chip or IC, the optical receiver comprising (i) a photodiode, (ii) a photosensor, or (iii) a second waveguide and either (1) a second grating coupler or (2) a reflective surface, the second waveguide having a height of from 100 nm to 1000 nm and a width of from 200 nm to 10,000 nm; and
   receiving the further reflected and focused optical signal at the optical receiver.

11. The method of claim 10, further comprising carrying the optical signal in the first waveguide in the first photonics chip or IC before transmitting the light from the optical transmission mechanism.

12. The method of claim 10, further comprising carrying the optical signal in the second waveguide in the second photonics chip or IC after receiving the optical signal at the optical receiver.

13. A method of manufacturing a light transfer system, comprising:
   forming or making or an optical transmission mechanism and a focusing mirror on a first photonics chip or integrated circuit (IC), the optical transmission mechanism comprising (i) a first waveguide and (ii) a first grating coupler, wherein:
      the first waveguide is configured to cam an optical signal and is optically, coupled to the grating coupler,
      the first waveguide comprises an n-doped laver, a p-doped laver, and an overlying dielectric layer,
      the n-doped layer and the p-doped layer form a p-n junction, and
      the first waveguide having a height of from 100 nm to 1000 nm and a width of from 200 nm to 10,000 nm;
   forming or making an optical receiver and a reflecting mirror on a second photonics chip or IC, the optical receiver comprising (i) a photodiode, (ii) a photosensor, or (iii) a second waveguide and either (1) a second grating coupler or (2) a second reflective surface, the second waveguide having a height of from 100 nm to 1000 nm and a width of from 200 nm to 10,000 nm; and
   positioning the first photonics chip or IC and the second photonics chip or IC such that the optical signal is (i) reflected by the reflecting mirror towards a first target on the first photonics chip or IC, (ii) further reflected and focused by the focusing mirror, and (iii) received by or at the optical receiver.

14. The method of claim 13, wherein the first target is the focusing mirror, and the focusing mirror directs the light to the optical receiver.

15. The method of claim 13, comprising forming the second waveguide in the second photonics chip or IC.

\* \* \* \* \*